United States Patent
Patil et al.

(10) Patent No.: US 9,489,226 B2
(45) Date of Patent: Nov. 8, 2016

(54) SYSTEMS AND METHODS TO MANAGE WRITE COMMANDS IN A CACHE

(71) Applicant: PernixData, Inc., San Jose, CA (US)

(72) Inventors: Mahesh Patil, Cupertino, CA (US); Murali Natarajan Vilayannur, San Jose, CA (US); Michal Ostrowski, Cedar Park, TX (US); Kaustubh Sambhaji Patil, Sunnyvale, CA (US); Woon Ho Jung, Cupertino, CA (US); Satyam B. Vaghani, San Jose, CA (US); Poojan Kumar, San Jose, CA (US)

(73) Assignee: PernixData, Inc., San Jose, CA (US)

( * ) Notice: Subject to any disclaimer, the term of this patent is extended or adjusted under 35 U.S.C. 154(b) by 405 days.

(21) Appl. No.: 14/298,409

(22) Filed: Jun. 6, 2014

(65) Prior Publication Data

US 2015/0358417 A1 Dec. 10, 2015

(51) Int. Cl.
*G06F 15/16* (2006.01)
*G06F 9/455* (2006.01)
*G06F 12/08* (2016.01)

(52) U.S. Cl.
CPC ....... *G06F 9/45533* (2013.01); *G06F 12/0804* (2013.01); *G06F 12/0868* (2013.01); *G06F 2009/45583* (2013.01); *G06F 2212/1016* (2013.01); *G06F 2212/152* (2013.01); *G06F 2212/263* (2013.01); *G06F 2212/465* (2013.01)

(58) Field of Classification Search
USPC .................. 709/219; 714/763; 711/165, 137
See application file for complete search history.

(56) References Cited

U.S. PATENT DOCUMENTS

| | | | | |
|---|---|---|---|---|
| 7,549,029 B2* | 6/2009 | Zohar | ............... | G06F 3/0605 711/162 |
| 2003/0026161 A1* | 2/2003 | Yamaguchi | ........... | G11C 7/1006 365/230.03 |
| 2003/0056060 A1* | 3/2003 | Hertz | .............. | G06F 3/0613 711/112 |
| 2003/0110352 A1* | 6/2003 | Hashimoto | ............ | G06F 3/0613 711/113 |
| 2005/0135160 A1* | 6/2005 | Kim | ............... | G11C 7/1006 365/189.05 |
| 2009/0119567 A1* | 5/2009 | Kawabata | ............ | G06F 11/1032 714/763 |
| 2011/0066821 A1* | 3/2011 | Rijshouwer | .......... | G11C 7/1006 711/165 |
| 2013/0073793 A1* | 3/2013 | Yamagishi | .............. | G06F 13/16 711/103 |
| 2014/0006719 A1* | 1/2014 | Floman | ............... | G06F 12/0862 711/137 |
| 2014/0122809 A1* | 5/2014 | Robertson | ............ | G06F 12/0895 711/141 |
| 2015/0358417 A1* | 12/2015 | Patil | .............. | G06F 12/0804 709/219 |
| 2016/0085445 A1* | 3/2016 | Lee | ............... | G06F 3/061 711/103 |

* cited by examiner

*Primary Examiner* — Tammy Nguyen
(74) *Attorney, Agent, or Firm* — Gard & Kaslow LLP

(57) ABSTRACT

When a virtual machine sends a write command to a host operating system, a cache system stores the record included in the write command and later sends the write command to a storage system. Systems and methods store an indication of when the write command was received along with the received records in the cache. The cache system determines an order of the records from the indication. In some instances, records received at the same time are serialized and/or assigned record numbers. The simultaneously received records can be assigned a batch number. According to the determined order, the records are retrieved from the cache memory and included in write commands sent to the storage system. In some instances, checkpoints can be stored to prevent records from being re-sent to the storage system following a failure.

11 Claims, 12 Drawing Sheets

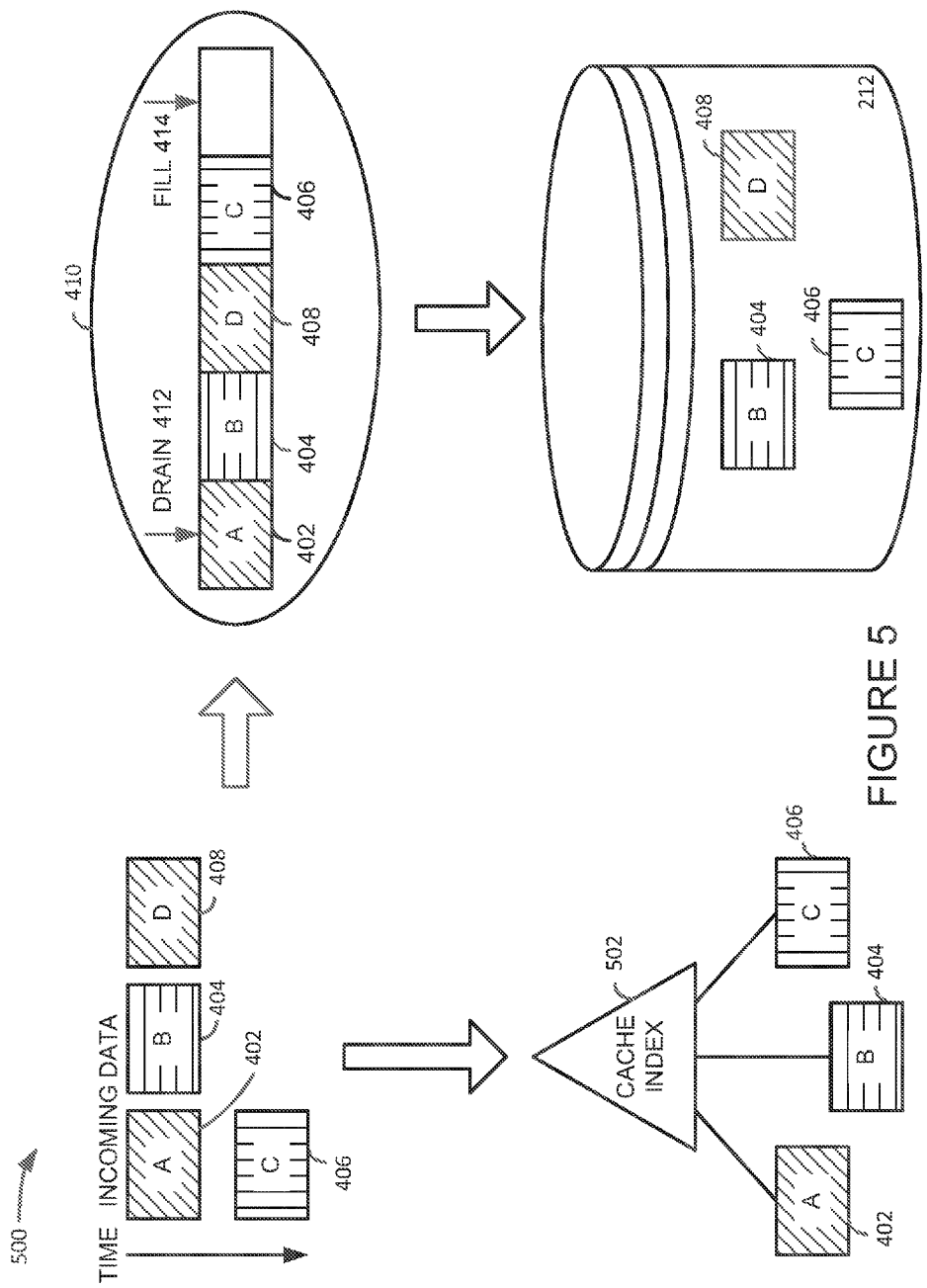

SYSTEMS AND METHODS TO MANAGE WRITE COMMANDS IN A CACHE

BACKGROUND

1. Field

This patent application relates generally to data caching and more specifically to managing write commands in a cache of a virtual machine.

2. Description of Related Art

In computing systems, a cache is a memory system or subsystem which transparently stores data so that future requests for that data can be served faster. As an example, many modern microprocessors incorporate an instruction cache holding a number of instructions; when the microprocessor executes a program loop where the same set of instructions are executed repeatedly, these instructions are fetched from the instruction cache, rather than from an external memory device at a performance penalty of an order of magnitude or more.

In other environments, such as where a computing system hosts multiple virtual machines with each virtual machine running one or more applications, computing system-side caching of objects stored on a network attached storage system can provide significant performance improvements. In some instances, records are simultaneously cached and written to a network attached storage system according to a "write-through" algorithm. In other instances, records are cached and then written to the network attached storage system according to a "write back" algorithm. In the "write back" algorithm, the received record is written to the cache before being written to the network attached storage system. The cache system can then direct the writing of the record to the network attached storage system.

Caching can create issues when the order of the application's incoming write data is not preserved at the time the "write back" algorithm writes out said cached data to longer-term storage, such as a storage area network (SAN). When not ordered correctly, records can become shuffled, leading to application failures or inconsistencies. In some prior art systems, an in-place caching system is used. FIG. 1 depicts an example process for caching records using in-place caching. The shading of the record corresponds to a SAN memory location where the record is to be stored. As depicted in FIG. 1, four records (A 102, B 104, C 106, and D 108) are received in chronological order (as also indicated by the alphabetical labelling of the records). As indicated by the shading of the records, the first record A 102 and the fourth record D 108 are both to be stored in a same SAN memory location. According to existing in-place caching systems, each memory location in a cache 110 is assigned to a corresponding SAN memory location. As such, when record A 102 is received, it is written into a first cache memory location, and when the record D 108 is received, record A 102 is overwritten with the record D 108. If the record A 102 had not yet been written to a SAN 112 before being overwritten, the record A 102 has effectively not happened. This can become a problem if record B 104 and record C 106 (following record A 102) are not written to the SAN 112 before record D 108 is written to the SAN 112. In this case, previous records, X 114 and Y 116, remain in the SAN memory locations corresponding to the records B 104 and C 106 when record D 108 is written to the SAN 112. This means that, instead of the SAN 112 containing records B 104, C 106, and D 108 reflecting the order that they were received, the SAN 112 contains records X 114, Y 116, and D 108 even though the concurrent storage of these three records is not consistent with their chronology. When records are shuffled in this way, the data is unreliable, operations may be lost, and applications may fail.

While other write-back caching algorithms exist, caching and retrieving data quickly and accurately remains a challenge.

SUMMARY

According to various embodiments, a method comprises: receiving a first write command sent from a virtual machine to a host operating system running on a computing system, the first write command instructing a storage system to store a first record at a first storage system memory location; storing the first record at a first location in a storage cache with an indication of when the first write command was received; receiving a second write command sent from the virtual machine to the host operating system running on the computing system, the second write command instructing the storage system to store a second record at the first storage system memory location; storing the second record at a second location in the storage cache with an indication of when the second write command was received; determining an order of the first record and the second record based on the stored indication of when the first write command was received and the stored indication of when the second write command was received; and based on the determined order, retrieving the first record from the first cache location and sending the first write command to the storage system, and then retrieving the second record from the second cache location and sending the second write command to the storage system.

According to various embodiments, a system comprises: a staging module configured to receive a first write command sent from a virtual machine to a host operating system running on a computing system, the first write command instructing a storage system to store a first record at a first storage system memory location, store the first record at a first location in a storage cache with an indication of when the first write command was received, receive a second write command sent from the virtual machine to the host operating system running on the computing system, the second write command instructing the storage system to store a second record at the first storage system memory location, and store the second record at a second location in the storage cache with an indication of when the second write command was received; and a destaging module configured to determine an order of the first record and the second record based on the stored indication of when the first write command was received and the stored indication of when the second write command was received, and based on the determined order, retrieve the first record from the first cache location and sending the first write command to the storage system, and then retrieving the second record from the second cache location and sending the second write command to the storage system.

According to various embodiments, a non-transitory machine-readable medium has instructions embodied thereon, the instructions executable by one or more processors to perform a method comprising: receiving a first write command sent from a virtual machine to a host operating system running on a computing system, the first write command instructing a storage system to store a first record at a first storage system memory location; storing the first record at a first location in a storage cache with an indication of when the first write command was received; receiving a second write command sent from the virtual machine to the host operating system running on the computing system, the second write command instructing the storage system to store a second record at the first storage system memory location; storing the second record at a second location in the storage cache with an indication of when the second write command was received; determining an order of the first record and the second record based on the stored indication of when the first write command was received and the stored indication of when the second write command was received; and based on the determined order, retrieving the first record from the first cache location and sending the first write command to the storage system, and then retrieving the second record from the second cache location and sending the second write command to the storage system.

BRIEF DESCRIPTION OF THE DRAWINGS

FIG. 5 depicts an example process for caching simultaneously received records, according to various embodiments.

DETAILED DESCRIPTION

Write-back caching is used to reduce the amount of time required by a computing system to process read and write commands (also referred to as "IO" commands) by accessing a faster, short-term volatile or non-volatile memory instead of relying solely on a slower, long-term memory such as a storage system. Records can be written to or read from the cache during operation. Existing systems, such as the in-place system discussed above, can result is records becoming shuffled or missing.

To cure at least this deficiency, a logical circular staging area for logging write commands is implemented in a cache. The logical circular staging area is a logical construct used by the caching system that is configured to stage received write commands so that the received write commands are written to the storage system in a consistent order. The logical circular staging area is a logical construct that can be implemented in a variety of ways.

A number of techniques can be used to refine the use of the logical circular staging area, including serializing records that were simultaneously received, assigning record numbers to the received records, storing checkpoints indicating that a record has been stored to the storage system, and storing batch numbers indicating which records were simultaneously received.

Figure 2:
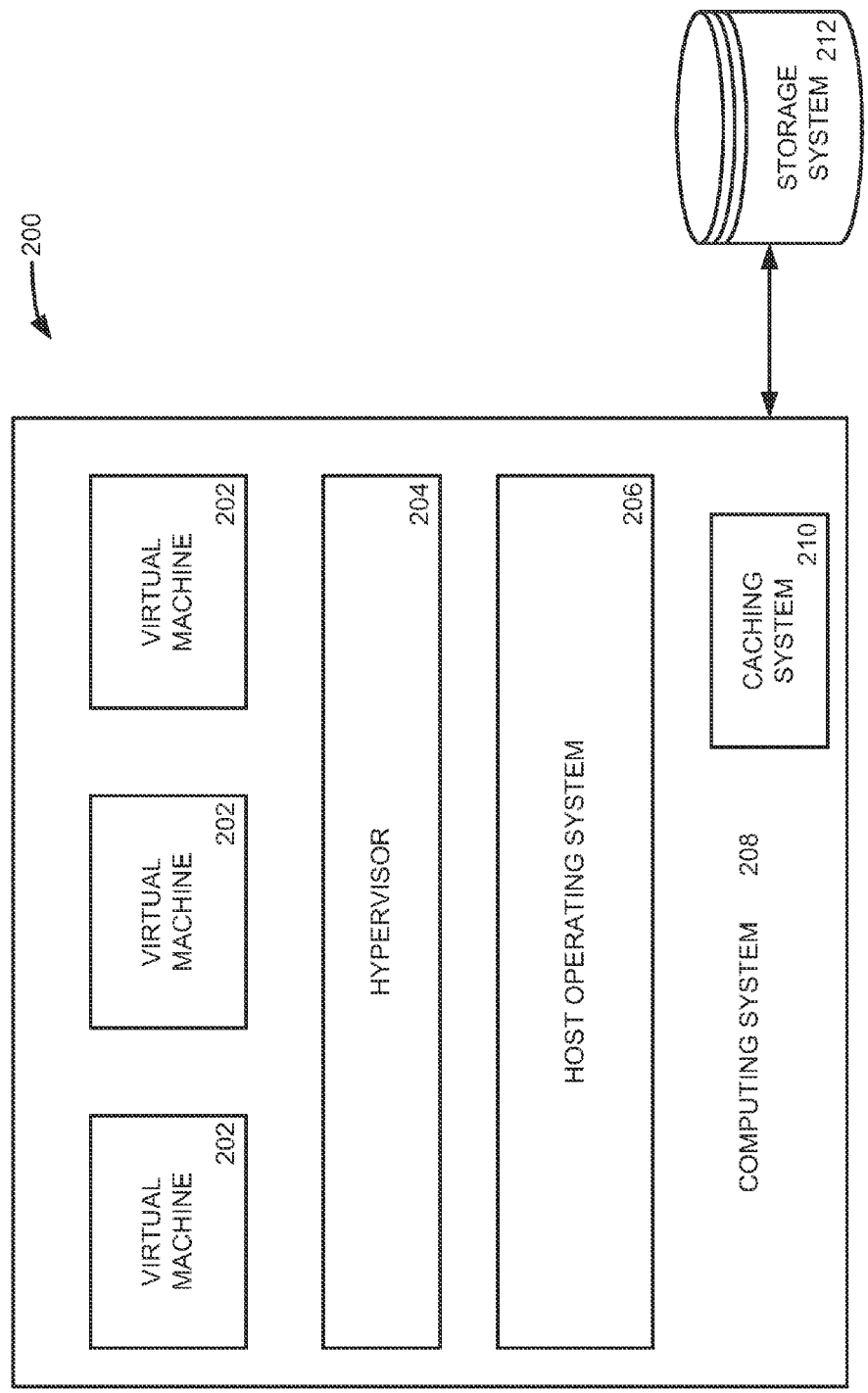
FIG. 2 is a block diagram of a portion of an environment in which various embodiments can be practiced.

FIG. 2 is a block diagram of a portion of an environment 200 in which various embodiments can be practiced. The environment 200 comprises one or more virtual machines 202 executed by a hypervisor 204. The hypervisor 204 is executed by a host operating system 206 (which may itself include the hypervisor 204). The host operating system 206 resides on a physical computing system 208 having a caching system 210. The caching system 210 caches data within a local memory (e.g., a cache memory 306, discussed herein). The local memory is a faster, more expensive memory such as flash memory. The computing system 208 is configured to communicate with a storage system 212 to store data. The storage system 212 is a slower memory, such as a hard disk. The environment 200 can include multiple computing systems 208 and/or storage systems 212. Examples of storage system 212 include, but are not limited to, a storage area network (SAN), a local disk, a shared serial attached "small computer system interface (SCSI)" (SAS) box, a network file system (NFS), a network attached storage (NAS), and an object store.

When a virtual machine 202 generates a read command or a write command, the application sends the generated command to the host operating system 206. The virtual machine 202 includes, in the generated command, an instruction to read or write a record at a specified location in the storage system 212. The cache system 210 receives the sent command and caches the record and the specified storage system memory location. In a write-back system, the generated write commands are subsequently sent to the storage system 212.

In some embodiments of the present approach, and as is apparent to those skilled in the art in light of the teachings herein, the environment 200 of FIG. 2 can be further simplified to being a computing system running an operating system running one or more applications that communicate directly or indirectly with the storage system 212.

Figure 3:
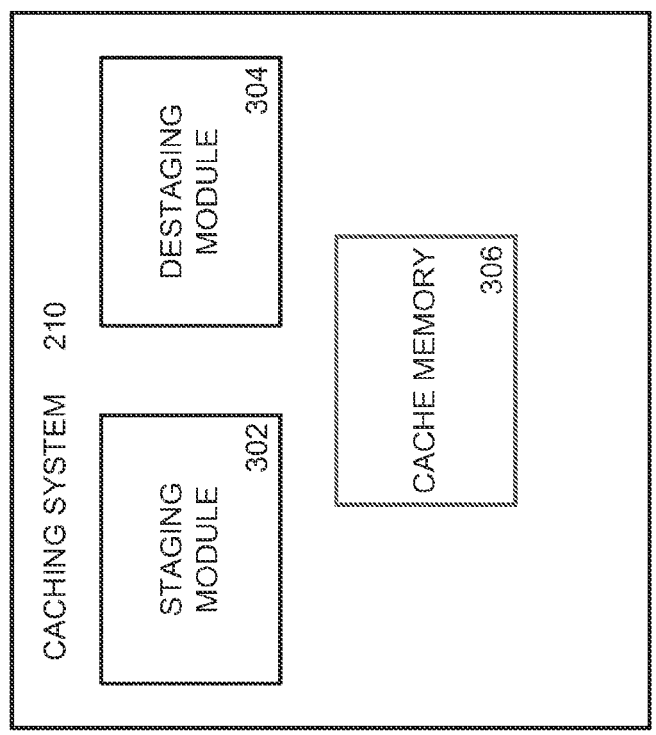
FIG. 3 is a block diagram of a caching system, according to various embodiments.

FIG. 3 is a block diagram of the caching system 210, according to various embodiments. The caching system 210 comprises a staging module 302, a destaging module 304, and a cache memory 306. The caching system 210 can be implemented in a variety of ways known to those skilled in the art including, but not limited to, as a computing device having a processor with access to a memory capable of storing executable instructions for performing the functions of the described modules. The computing device can include one or more input and output components, including components for communicating with other computing devices via a network (e.g., the Internet) or other form of communication. The caching system 210 comprises one or more modules embodied in computing logic or executable code such as software.

The caching system 210 controls the cache memory 306 of the computing system 208. In some instances, the caching system 210 is hosted by the computing system 208. The caching system 210 can be part of, or separate from, the hypervisor 204 and/or the operating system 206.

The staging module 302 is configured to receive incoming write commands sent from the virtual machine 202 to the host operating system 206. The staging module 302 stores the received commands in the cache memory 306 so that the received records can be retrieved by the destaging module 304 or read from the cache memory 306 responsive to a read command or written to the cache memory 306 responsive to a write command.

The destaging module 304 is configured to write records from the cache memory 306 to the storage system 212. The destaging module 304 is configured to determine the order of the records and to retrieve the records in order from a cache location where the records were stored when received from the virtual machine 202. The destaging module 304 is configured to send the write commands to the storage system 212 instructing the storage system 212 to write the retrieved records at respective locations in the storage system 212.

The cache memory 306 can, in various embodiments, include volatile and non-volatile memory. The volatile memory can hold data structures including logical constructs such as a write logging staging area (e.g., write logging staging area 410, described below), and a cache index (e.g., cache index 502, described below) that store pointers to cached records. The non-volatile memory or the volatile memory can store the cached records.

Figure 4:
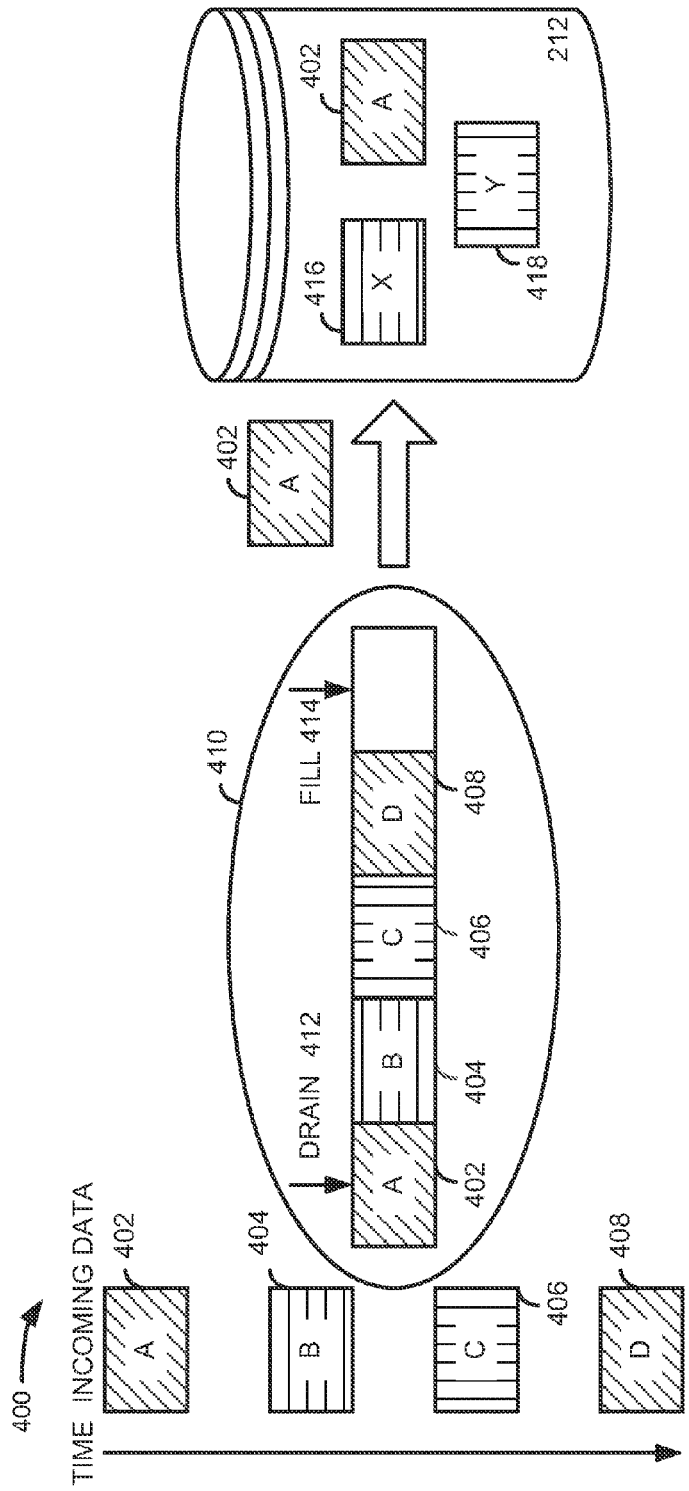
FIG. 4 depicts an example process for caching records, according to various embodiments.

FIG. 4 depicts an example process 400 for caching records, according to various embodiments, that can be performed by the staging module 302. The example process 400 includes a write logging staging area 410 that is set up to operate as a circular buffer. The write logging staging area is implemented as a logical construct in volatile memory by the caching system 210.

For simplicity, write logging staging area 410 is depicted throughout the figures as containing the received records. In implementation, however, the write logging staging area 410 can store pointers to the received records which can be stored separately in the cache memory 306. In some implementations, the write logging staging area 410 is implemented in volatile memory while the records are stored in non-volatile memory.

Figure 1:
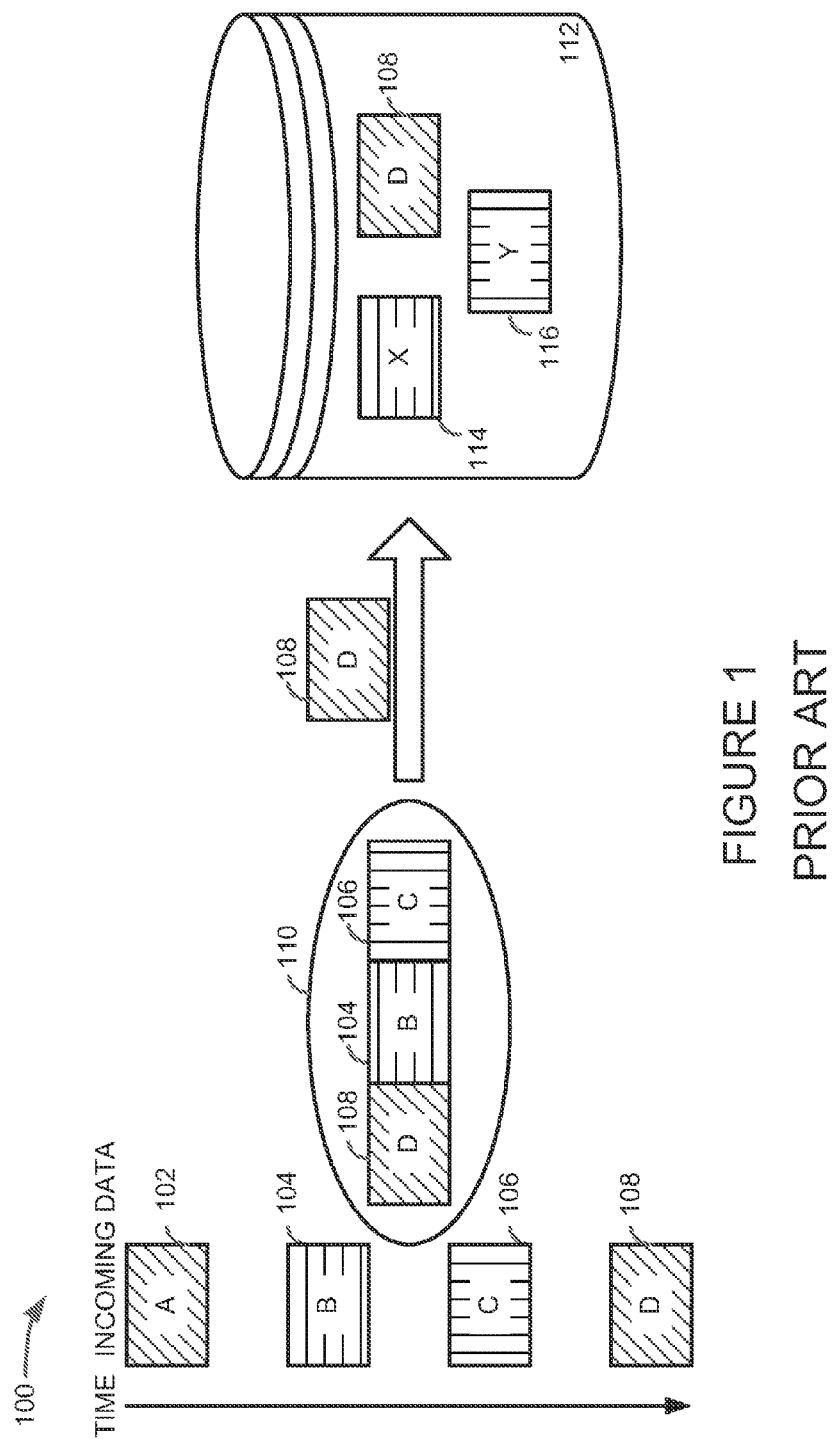
FIG. 1 depicts an example process for caching records to a SAN using in-place caching.

Staying consistent with the conventions of FIG. 1, the shading of the records A 402, B 404, C 406, and D 408 indicates the storage system memory locations where the records are to be stored. However, unlike the prior art in-place cache system shown in FIG. 1, the shading does not indicate the cache memory location used to cache the records A 402, B 404, C 406, and D 408.

To illustrate the operation of the write logging staging area 410, the records are received in a chronological order from the virtual machine 202 as indicated by the time arrow on the left hand side of the figure. In this example, the order is that the record A 402 is followed by the record B 404, which is followed by the record C 406, which is, in turn, followed by the record D 408. As indicated by the shading of the respective records, the record A 402 and the record D 408 are to be stored at a same storage system memory location. The record B 404 and the record C 406 are to be stored at other storage system memory locations.

In the write logging staging area 410, the records are logically assembled into a data structure operating as a circular buffer having a drain position 412 and a fill position 414 using a variety of techniques known to those skilled in the art, such as, for example, a link list. In the circular buffer, a "first in, first out" (FIFO) method is used to determine which record to next send to the storage system 212 from the cache memory 306. As depicted, the first record, record A 402 is presently at the drain position 412 of the circular buffer. The later records, records B 404, C 406, and D 408, are presently at later positions in the circular buffer between the drain position 412 and the fill position 414. Subsequent records stored in cache memory 306 will be added at the fill position (e.g., fill 414) of the circular buffer thus causing the fill position 414 to move further to the right of the circular buffer in the figure.

According to the depicted embodiment, the relative position of the records within the circular buffer provides a relative indication of when each record or write command was received from the virtual machine. Using the FIFO method, the record A 402 is sent to the storage system 212 before the other records because it was received before them. As such, the record A 402 is stored concurrently with records X 416 and Y 418 previously stored in the storage system 212. As indicated by the shading, the record X 416 is stored in the storage system memory location that the record B 404 is to be stored and the record Y 418 is stored in the storage system memory location that the record C 406 is to be stored. In this way, the record D 408 is not stored concurrently with the records X 416 and Y 418 in the storage system 212, as was described and shown with reference to FIG. 1. This approach therefore maintains the proper sequence of commands received from the virtual machine 202 for storage in the storage system 212.

However, issues may arise when two or more write commands are received at the same time from the virtual machine 202. FIG. 5 depicts an example process 500 for caching simultaneously received records, according to various embodiments. In some instances, the virtual machine 202 can send more than one write command to the host operating system 204 at the same time. These more than one simultaneously sent write commands can instruct the storage system 212 to write different records to the same storage system memory location. Because the records are received simultaneously, there is no inherent or pre-existing order and the staging module 302 is forced to randomly assign an order to the simultaneously received records. While the random assignment of an order may not necessarily affect the accuracy of the storage system 212, the random assignment can introduce harmful inconsistencies when the records are sent to the storage system 212 in a different order than when the records were stored in the cache memory (e.g., cache memory 306).

To illustrate, three records (A 402, B 404, and D 408) are received simultaneously from the virtual machine 202, followed by the record C 406, as indicated by the time arrow on the left hand side of the figure. In the instance shown, the record A 402 and the record D 408 are to be stored to the same storage system memory location. Within the write logging staging area 410, the record A 402 is positioned before the record D 408 due to the random assignment discussed supra. Thus, when the records are written to the storage system 212 in the assigned storage system memory locations, the record D 408 will overwrite the record A 402, resulting in the storage system 212 containing records B 404, C 406, and D 408. However, the random assignment ordering record A 402 before record B can lead to other errors as will now be described.

When the ordering of the records A 402 and D 408 is not preserved, the cache memory 306 may be inconsistent with the storage system 212 which can cause a problem as will now be explained. When responding to read commands using records stored in the cache memory 306 rather than records stored in the storage system 212, the caching system 210 can access a cache index 502 (e.g., a data structure, such as a B-Tree), that indicates a most recent record stored in cache memory 306 corresponding to the respective storage system memory locations. As with the write logging staging area 410, the staging module 302 is also forced to randomly assign an order to the simultaneously received records having no inherent or pre-existing order when updating the cache index 502. Because the above randomly assigned order for the storage system 212 is performed independently of the random assignment for the cache index 502, for example by two separate processes, the two randomly assigned orders cannot be assumed to be identical. For example, the record D 408 can be randomly assigned as coming before record A 402, which is inconsistent with the destaging order above. The cache index 502 in the figure identifies records A 402, B 404, and C 406 as being the most recent for those storage system memory locations, which is harmfully inconsistent with the write logging staging area 410 which causes the record D 408 to overwrite the record A 402. If a read command to read the storage system memory location corresponding to the records A 402 and D 408 is received, the cache memory 306 will return record A 402 yet, at some other point in time with a cache miss, the storage system 212 will return the record D 408.

Figure 6A:
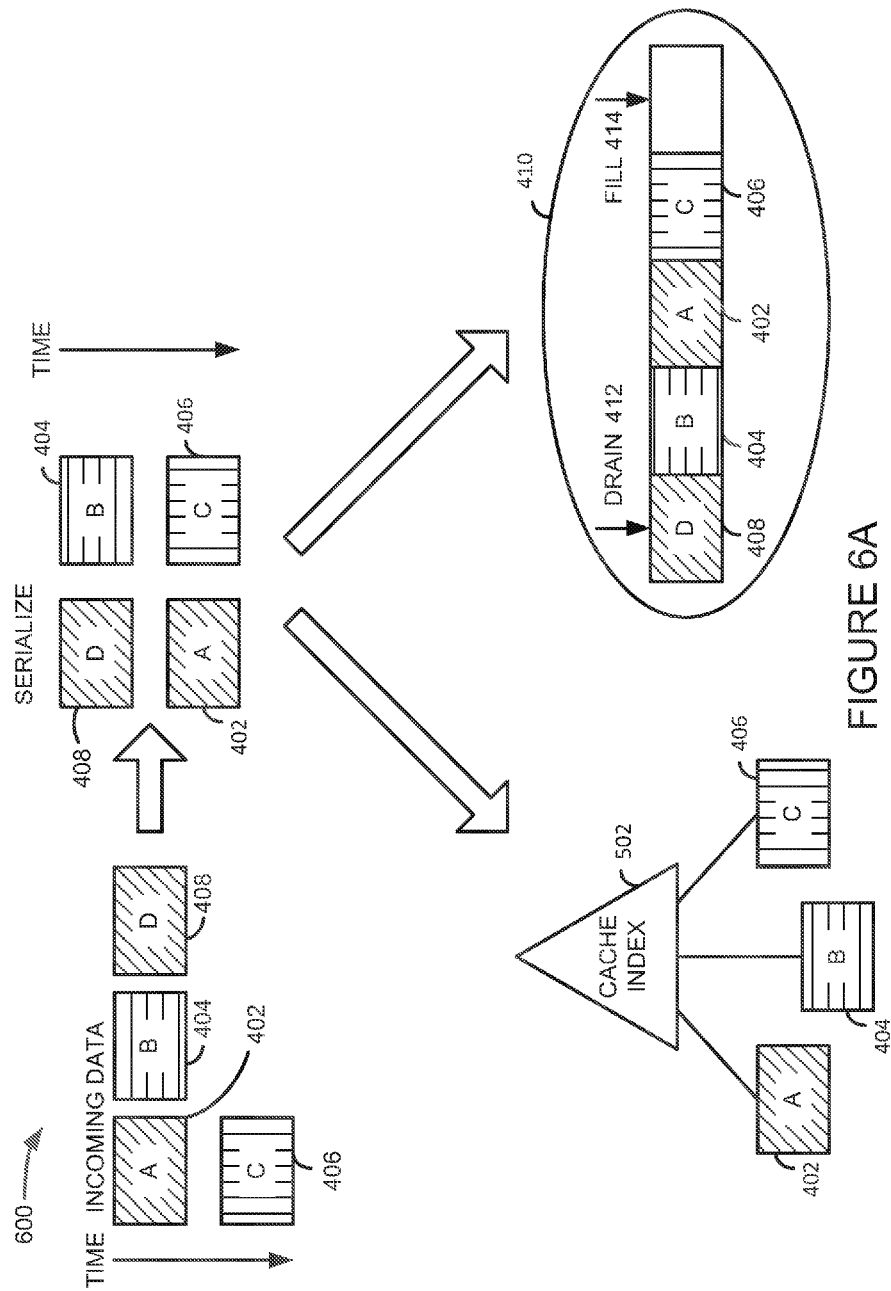
FIG. 6A depicts an example process for caching records with serialization, according to various embodiments.

To prevent harm caused by this inconsistency resulting from receiving records simultaneously, serialization of the records can be performed. FIG. 6A depicts an example process 600 for caching records with serialization, according to various embodiments. Serialization is performed by the staging module 302 at least to prevent harmful inconsistencies between the contents of the storage system 212 and the cache index 502 caused by receiving records simultaneously as described in connection with FIG. 5.

While the cache index 502 is depicted throughout the figures as containing the received records, the cache index 502 merely stores pointers to the received records. The received records are stored separately in the cache memory 306. In some implementations, the cache index 502 is implemented in volatile memory while the records are stored in non-volatile memory.

As depicted in FIG. 6A, three records (A 402, B 404, and D 408) are received simultaneously from the virtual machine, followed by the record C 406. In the instance shown, the record A 402 and the record D 408 are to be stored to the same storage system memory location. The staging module 302 serializes the records that were both simultaneously received and assigned to the same storage system memory location, in the depicted instance, records A 402 and D 408. The records A 402 and D 408 are serialized by ordering record A 402 after record D 408 in the write logging staging area 410. Within the write logging staging area 410, the record D 408 is positioned earlier than the record A 402. Thus, when the records are written to the storage system 212 in the assigned storage system memory locations, the record A 402 overwrites the record D 408, resulting in the storage system 212 containing records A 402, B 404, and C 406. In anticipation of receiving a read command indicating the storage system memory locations corresponding to the records A 402, B404, C 406, and/or D 408, the serialization performed by the staging module 302 is reflected in the cache index 502, which indicates that the records A 402, B 404, and C 406 (because record A 402 arrives chronologically after record D 408 due to serialization) are the most recent records to be stored in the storage system memory locations. As such, the storage system 212 and the cache index 502 are consistent with one another.

Figure 6B:
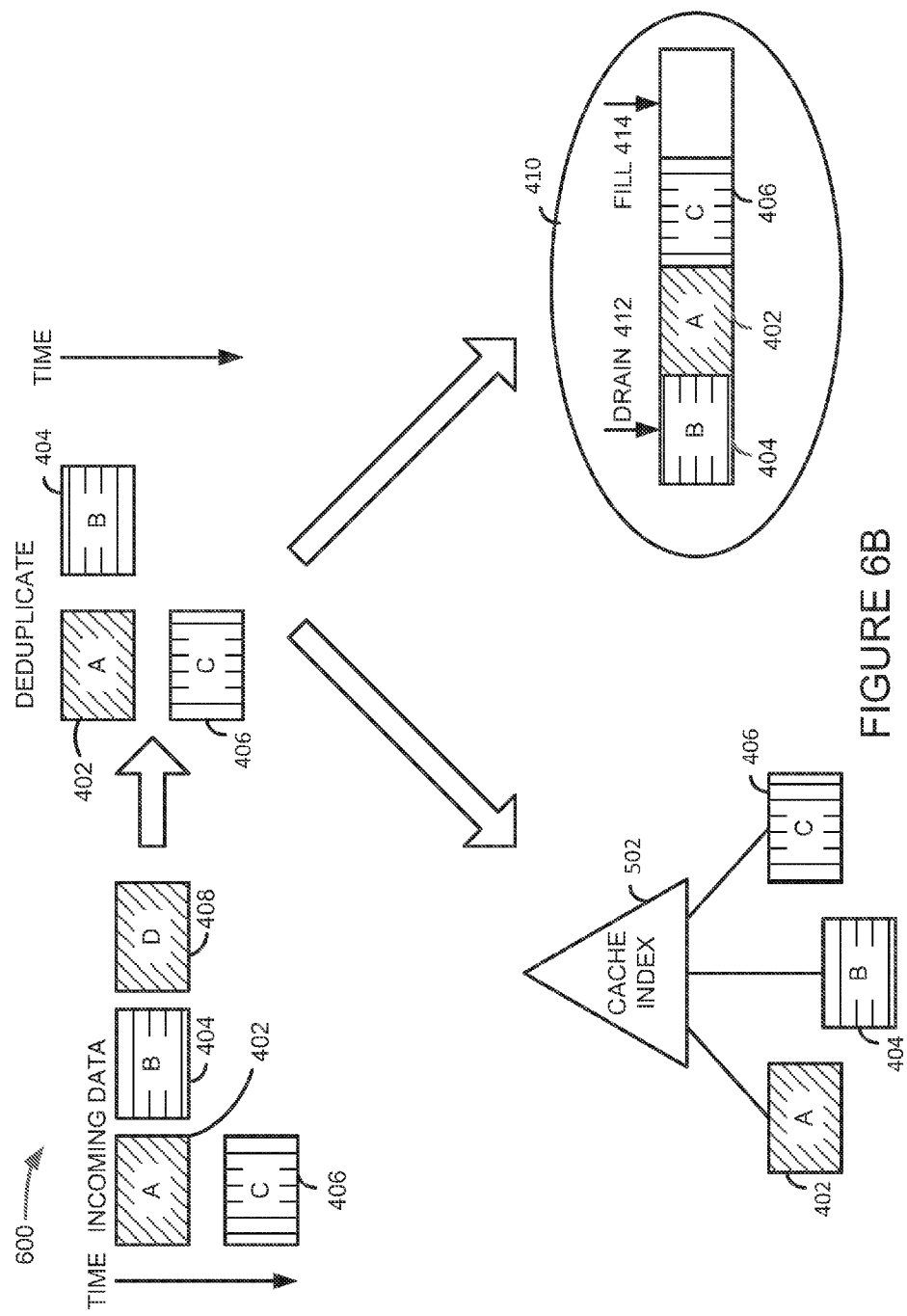
FIG. 6B depicts an example process for caching records with deduplication, according to various embodiments.

FIG. 6B depicts an example process for caching records with deduplication, according to various embodiments. As was the case with the example of FIG. 6A, three records (A 402, B 404, and D 408) are received simultaneously from the virtual machine, followed by the record C 406. In the instance shown, the record A 402 and the record D 408 are to be stored to the same storage system memory location. The staging module 302 deduplicates or removes (at random) one of the records that were both simultaneously received and assigned to the same storage system memory location, in the depicted instance, records A 402 and D 408.

The records A 402 and D 408 are deduplicated by storing record A 402 in the cache memory 306 and not caching record D 408. Within the write logging staging area 410, the record A 402 is staged. Thus, when the records are written to the storage system 212 in the assigned storage system memory locations, the record A 402 is written, resulting in the storage system 212 containing records A 402, B 404, and C 406. In anticipation of receiving a read command indicating the storage system memory locations corresponding to the records A 402, B404, C 406, and/or D 408, the deduplication performed by the staging module 302 is reflected in the cache index 502, which indicates that the records A 402, B 404, and C 406 (because record A 402 was stored in the cache memory 306 while record D 408 was not cached due to deduplication) are the most recent records to be stored in the storage system memory locations. As such, the storage system 212 and the cache index 502 are consistent with one another.

Referring to write logging staging area 410 as depicted in FIG. 6A, in an embodiment, the destaging module 304 destages each record one by one. In this instance, the destaging module 304 destages beginning at the drain position 412 by retrieving record D 408 from the cache memory 306 and sending a write command including record D 408 to the storage system 212. The destaging module 304 then retrieves the record B 404 from the write logging staging area 410 and sends a write command including the record B 404 to the storage system 212. This process is repeated for records A 402 and C 406.

In an alternative or further embodiment, to more efficiently destage the records from the write logging staging area 410, records can be destaged in parallel. Multiple records can be destaged at the same time if they are not to be stored in a same storage system memory location as other records currently in the write logging staging area 410. The destaging module 304 determines which records can be destaged at the same time while preserving the order of the records. Using the example depicted in FIG. 6A, the records D 408, B 404, and C 406 can be destaged at the same time because the records are to be stored at separate storage system memory locations. Record A 402 cannot be destaged before or at the same time as the record D 408 because, as indicated by the shading, these records are both to be stored at the same storage system memory location in the storage system 212. In some instances, a predefined threshold can limit the number of records that can be destaged at the same time. The threshold for non overlapping records is at least partially determined based on the total number of read or write commands that have been sent to the storage system 212 but have not yet been acknowledged as having been received by the storage system 212 (i.e., records that are "in flight"). When setting the threshold, it can be desirable to avoid overwhelming the storage system 212 with a large number of parallel read or write commands. In some instances, the threshold can be adjusted based on the type of storage system 212 and the number of read or write commands that are in flight.

Figure 7:
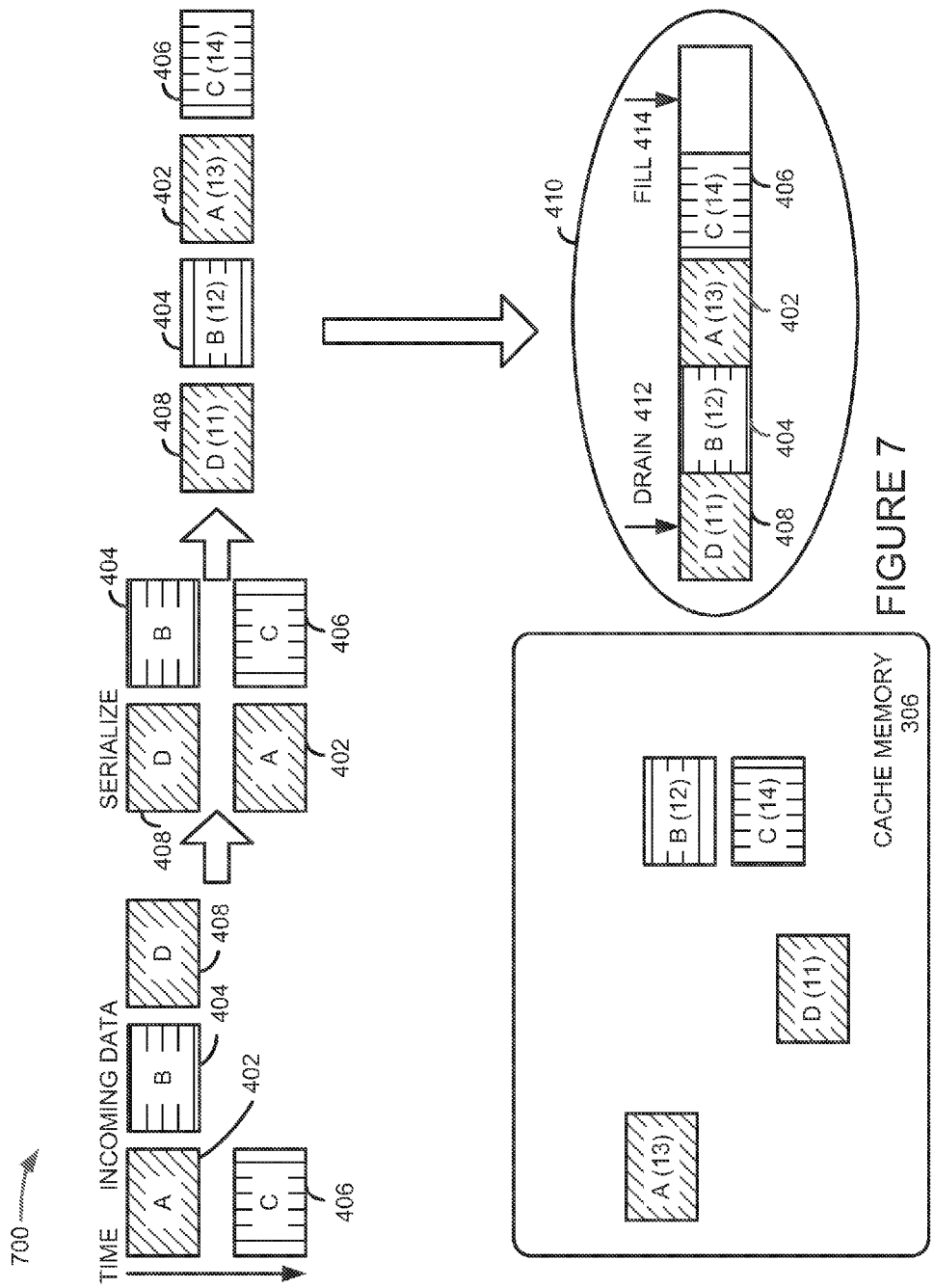
FIG. 7 depicts an example process for caching records using record numbers, according to various embodiments.

In some embodiments, staging and destaging can be implemented in such a way as to more efficiently recover from a failure that causes the ordered sequence of records in the cache to be lost. Because the write logging staging area 410 can be held in volatile memory that loses its contents in the event of a failure, any records staged in the write logging staging area 410 remain stored in the cache memory 306, but become unordered when a failure occurs. Stored, unordered records are referred to as unstaged records. FIG. 7 depicts an example process 700 for caching records using record numbers by the staging module 302, according to various embodiments, to address such a failure condition. If an application running on the virtual machine 202 or the computing system 208 fails, data that has been received by the cache memory 306 but not yet written to the storage system 212 is replayed. Replay is the process performed by the destaging module 304 to write out staged records from the cache memory 306 to the storage system 212 after a failure and reboot.

Replay relies on record numbers assigned to each record in the cache memory 306 to re-create the write logging staging area 410 following a failure. As described in connection with FIG. 6A, incoming data is received from the virtual machine 202 and serialized. As shown in FIG. 7, once serialized, the staging module 302 assigns a record number to each received record independent of the storage system memory location where the record is to be stored. In some instances, and as depicted, the assigned record numbers are monotonically increasing. The record number assigned to the record is stored with the record in the cache memory 306. The record numbers are assigned regardless of whether there has been a failure. As depicted in the example of FIG. 7, the record A 402 is assigned record number (13), the record B 404 is assigned record number (12), the record C 406 is assigned record number (14), and the record D 408 is assigned record number (11).

In summary, if a failure occurs, records staged in the write logging staging area 410 become unstaged. Using the record numbers stored with the records in the cache memory 306, the staging module 302 orders and stages records in the write logging staging area 410 (essentially, placing them back in their ordered sequence) so that the records can be properly written to the storage system 212 in the correct order.

Figure 8:
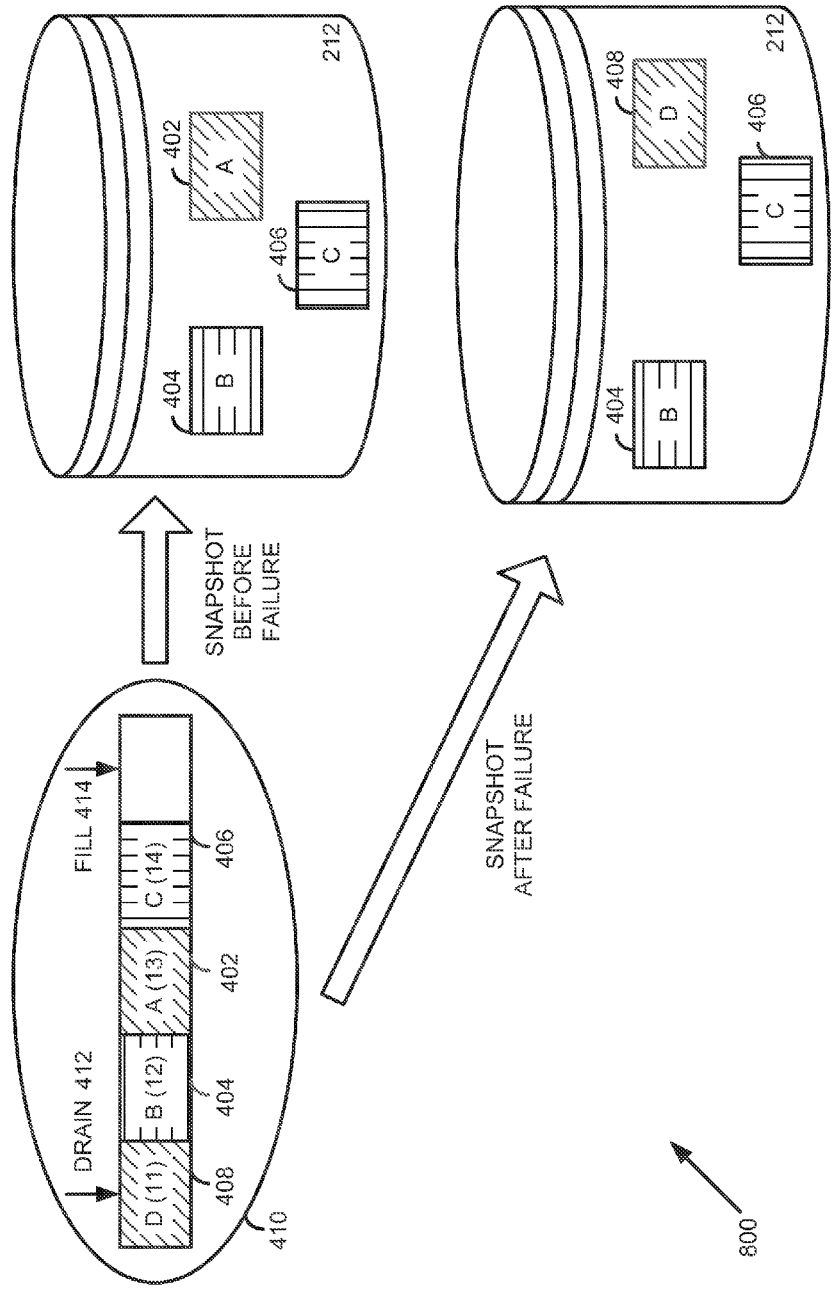
FIG. 8 depicts an example process for caching records and staging the write logging staging area after a failure.

This process will now be shown where FIG. 8 depicts an example process 800 for caching records and staging the write logging staging area 410 after a failure. Problematically and as will be explained here, the process 800 can result in the same records being sent twice to the storage system 212. In the process 800, cache memory locations storing records are positioned into the write logging staging area 410 and are assigned monotonically increasing record numbers. In the example shown, the record D 408 (record number (11)) is at the drain position 412 of the circular buffer of the write logging staging area 410, followed by records B 404 (record number (12)), A 402 (record number (13)), and record C 406 (record number (14)). The destaging module 304 destages the records in the write logging staging area 410. After the destaging, in this example, a first snapshot is taken of the storage system 212 indicating that records A 402, B 404, and C 406 are stored in the storage system 212. A snapshot, a term known in the art, is a back-up copy of at least a portion of the storage system 212 that is captured at a point in time. It is to be understood that the caching system 210 does not control when snapshots of the storage system 212 are taken because that is a backup function of the storage system 212 itself.

In this example, after the first snapshot is taken, a failure occurs which destages the records stored in the write logging staging area 410. A failure of the cache medium occurs if, for example, a host system fails or reboots after a crash or other event that causes a loss of power and a loss of data stored in the volatile memory. The destaging module 304 re-stages the write logging staging area 410 based on the order of the assigned record numbers with the cache memory locations storing records D 408, B 404, A 402, and C 406 as depicted in FIG. 8. The destaging module 304 begins sending write commands to the storage system 212 in the order reflected in the write logging staging area 410, beginning at the drain position 412, corresponding to the record D 408. As the drain position 412 moves along the write logging staging area 410, yet before the storage system 212 overwrites the record D 408 with the record A 402, in this example a second snapshot is taken of the storage system 212 (again, beyond the control of the caching system 210) indicating that the records B 404, C 406, and D 408 are stored in the storage system 212. In this example, the first snapshot and the second snapshot do not match as the snapshot taken after the failure has effectively gone back in time. Because the storage system 212 previously contained record A 402, which had overwritten the record D 408, this is particularly problematic because the second snapshot shows what, had the failure not occurred, the storage system 212 had previously contained before the first snapshot was taken. As such, the second snapshot of the storage system 212 is not a correct back-up copy because it depicts a state of the storage system 212 at an earlier point in time than the first snapshot despite having been taken at a later point in time.

Figure 9:
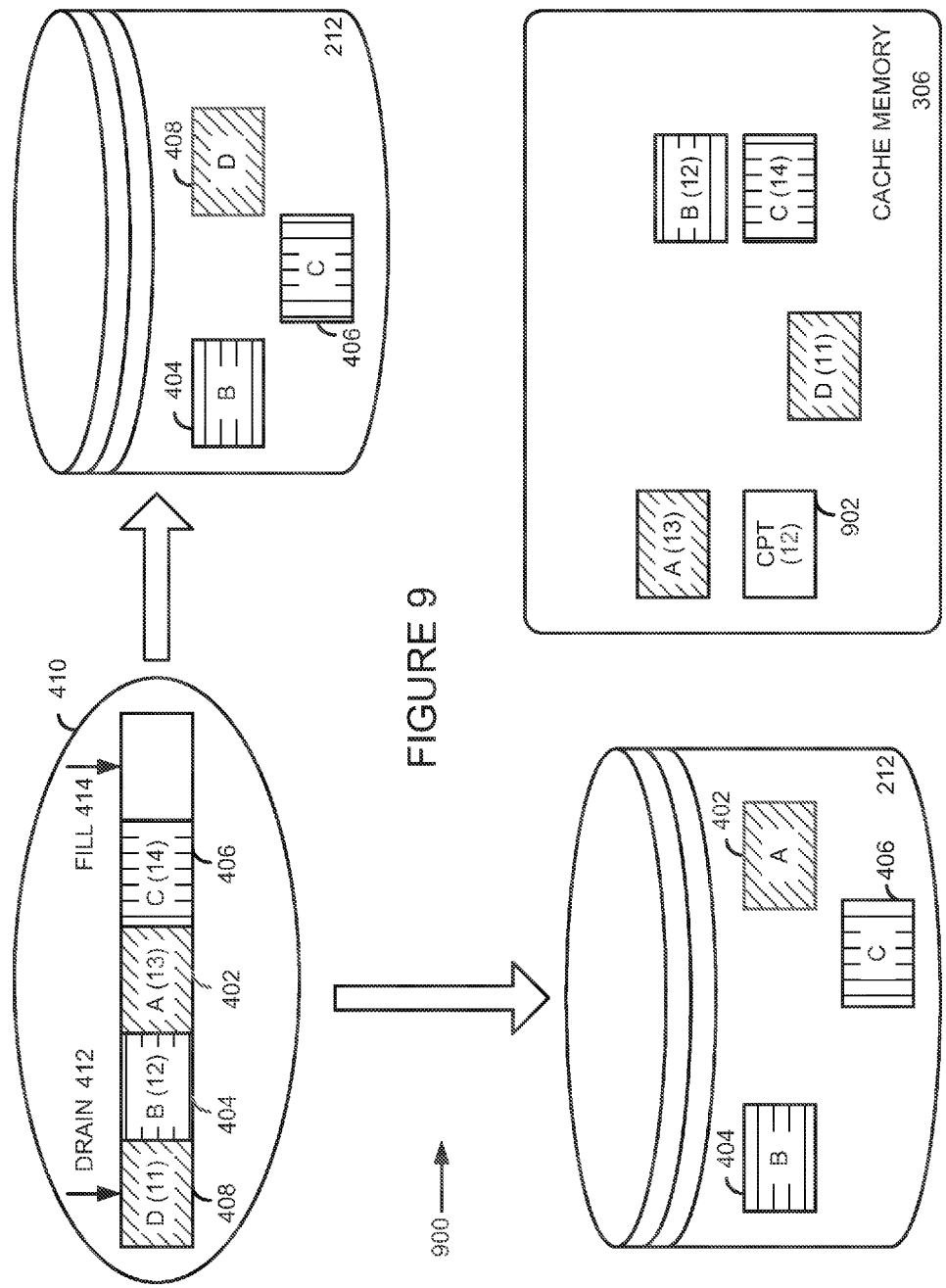
FIG. 9 depicts an example process for caching records using checkpoints, according to various embodiments.

To avoid the problems discussed in connection with FIG. 8, the destaging module 304 can store one or more checkpoints in the cache memory 306. FIG. 9 depicts an example process 900 for caching records using checkpoints, according to various embodiments. In the process 900, cache memory locations storing records are added into the write logging staging area 410 and are assigned monotonically increasing record numbers. In the example shown, the cache memory location storing record D 408 (record number (11)) is eventually positioned at the drain position 412 of the circular buffer of the write logging staging area 410, the record D 408 followed later by cache memory locations storing records B 404 (record number (12)), A 402 (record number (13)), and C 406 (record number (14)). Before a failure, the destaging module 304 destages the records D 408, B 404, and C 406 from the drain position 412 of the write logging staging area 410 to the storage system 212. In this example, a first snapshot is taken of the storage system 212 indicating that records D 402, and B 404, are stored in the storage system 212.

In this example, before record A 402 is included in a write command sent from the destaging module 304 to the storage system 212, a checkpoint record 902 is stored in the cache memory 306. The checkpoint record 902 is generated and stored by the destaging module 304 and is not sent to the storage system 212. The checkpoint record 902 includes the number of the record most recently included in a write command sent to the storage system 212. It is understood that a checkpoint record can be stored before each record is included in a write command sent to the storage system 212 or, as in the record A 402 example above, only before a record that overwrites a record in the storage system 212 is included in a write command.

If a failure occurs, the destaging module 304 accesses the checkpoint record 902. The destaging module 304 begins replaying the records in the write logging staging area from the record A 402 because it was assigned the next monotonically increasing record number (e.g., record number (13)) following the record number included in the checkpoint 902 (e.g., record number (12)). The destaging module 304 does not replay records having lower record numbers than the checkpoint record as it is assumed they were successfully written to the storage system 212 before the failure occurred. As such, the records are each only sent once to the storage system 212. Because the record is only sent once, a later snapshot taken of the storage system 212 remains consistent with earlier snapshots taken of the storage system 212.

Figure 10:
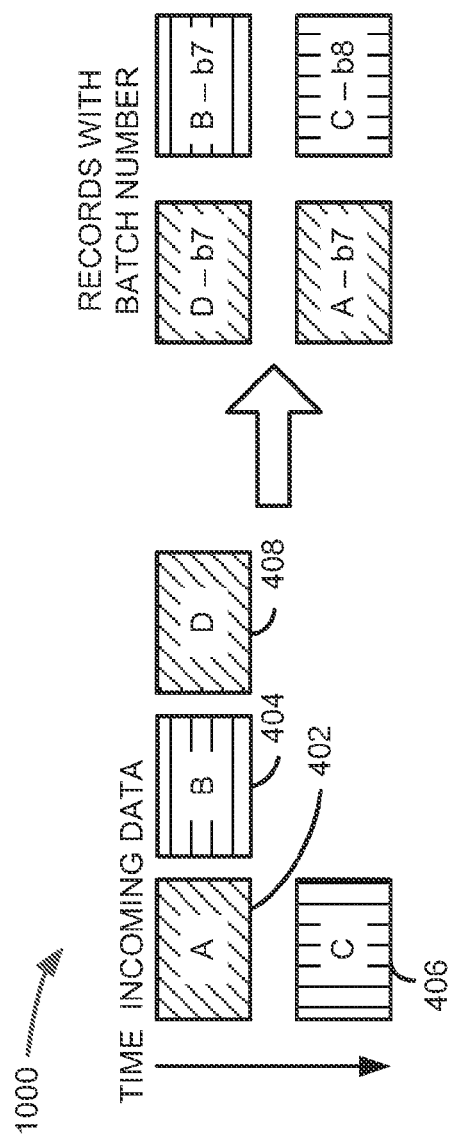
FIG. 10 depicts an example process for caching records using batch numbers, according to various embodiments.

Of course, the serialization process as discussed above, can cause the knowledge that the records were simultaneously received to be forgotten by the caching system 210, which can in turn cause a more strictly ordered destaging than is needed. To avoid this, when records are simultaneously received from the virtual machine 202, the caching system 210 can preserve this temporal information using batch numbers. The temporal information can be used to increase the efficiency of the system by allowing more than one record to be sent to the storage system 212 at a time. In an alternative embodiment, this temporal information is later accessed to more efficiently destage the records from the write logging staging area 410. FIG. 10 depicts an example process 1000 for destaging records using batch numbers, according to various embodiments.

The simultaneously received records are assigned a batch number by the caching system 210. The batch number identifies the batch in which the record was received. As depicted in FIG. 10, the records are stored with a batch number, for example "b7" for records A 402, B 404, and D 408, and "b8" for record C 406. The batch number b7 indicates that records A 402, B 404, and D 408 were received simultaneously. The batch number b8 indicates that the record C 406 was received after the records in the batch b7.

To maintain consistency between the cache index 502 maintained by the staging module 302, the write logging staging area 410, and the storage system 212, as illustrated in FIGS. 5 and 6, the records assigned the same batch number are not necessarily sent to the storage system 212 simultaneously. The records assigned the same batch number can be separated if, for example, two or more of the records are to be stored at a same storage system memory location. As depicted, simultaneously-received records A 402 and D 408 are assigned the same batch number, b7. When destaged by the destaging module 304, the records A 402 and D 408 are not destaged simultaneously because they are to be stored at the same storage system memory location. To avoid the storage system 212 randomly overwriting record D 408 with record A 402, or vice versa, the destaging module 304 sends record A 402 after record D 408, based on the relative order of the records from the serialization performed by the staging module 302. Record A 402 can be sent to the storage system 212 before the record C 406 (in the batch b8) or, because record A 402 and record C 406 are to be stored in different storage system memory locations, the record A 402 and the record C 406 can be sent to the storage system 212 simultaneously.

In some instances, the virtual machine 202 may send write commands more quickly than the caching system 210 is able to write back records to the storage system 212. In these instances, the cache memory 306 becomes completely filled and cannot add additional records. Absent any corrective action, the caching system 210 will stall.

To prevent the virtual machine 202 from stalling, the caching system 210 provides flow control. The caching system 210 is configured to track the amount (e.g., as a percentage) of the write logging staging area 410 being used to manage storage of records in the cache memory 306.

If a capacity of the cache memory 306 is met or exceeded, the caching system 210 begins rejecting a portion of the received read and write commands by issuing transient failure codes such as SCSI host busy, SCSI device busy, and check condition codes.

Alternatively, to prevent the cache memory 306 from becoming full, the caching system 210 can have multiple predefined thresholds to cause, as the write logging staging area 410 becomes more full, the application to delay sending additional commands. As the write logging staging area 410 approaches capacity, the caching system 210 artificially delays sending an acknowledgment of the command to the application. The application, in turn, observes this latency and responds by waiting to send more records to the storage system 212. This gives the write logging staging area 410 additional time to send records to the storage system 212 and therefore become less full. For example, a first predefined threshold is that 75% of the positions in the write logging staging area 410 are occupied which, when met, will cause the caching system 210 to delay sending an acknowledgment for each incoming application write for some period of time. The exact amount of delay can be configured to be close to the latency of a write to the storage system 212, or some function thereof. A second predefined threshold is set at a higher percentage of the write logging staging area 410, which, when met, causes the caching system 210 to increase the amount of delay sending an acknowledgement for each application write. The thresholds and the effects of meeting those thresholds can be configured by an administrator of the caching system 210.

Figure 11:
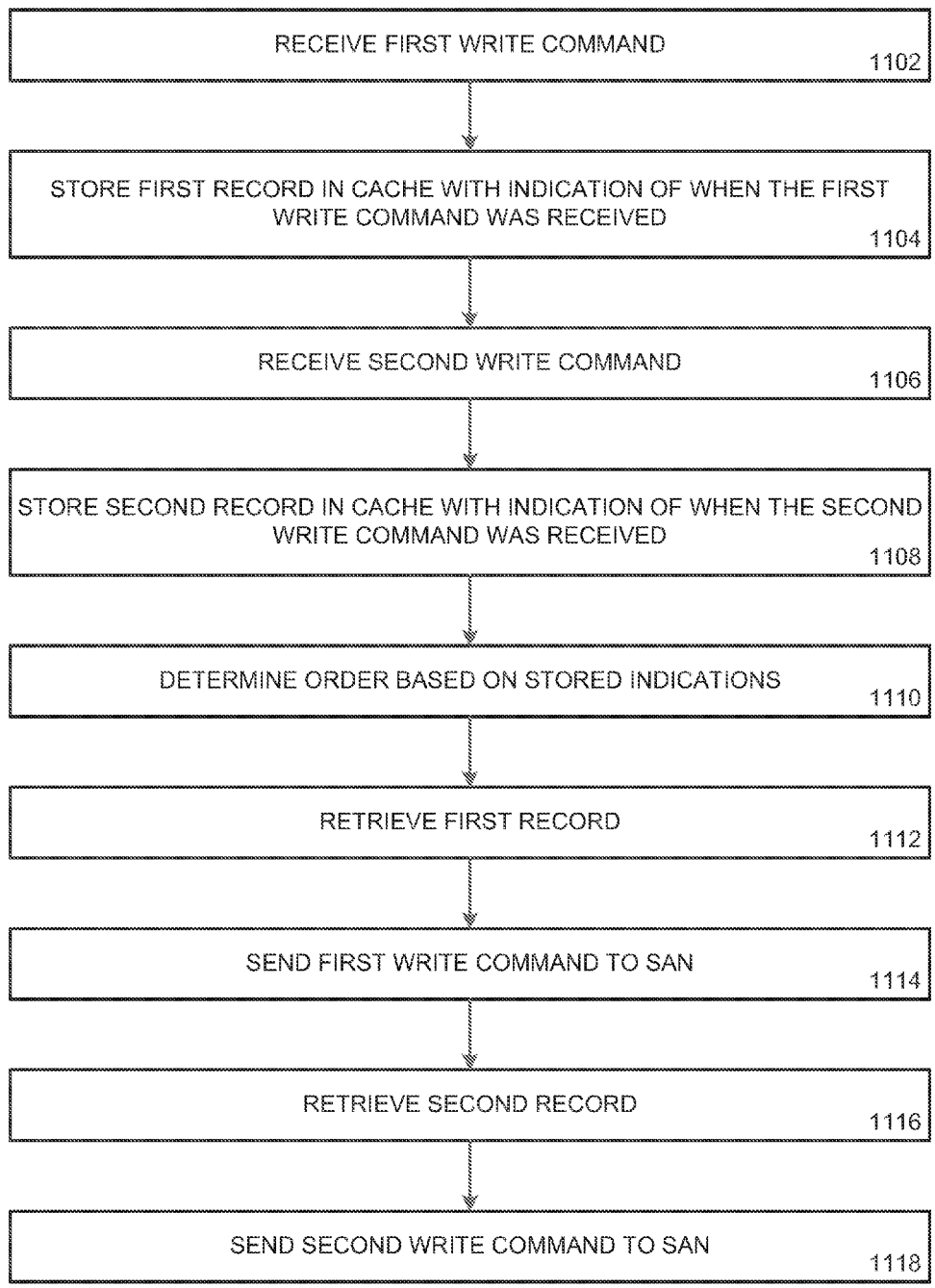
FIG. 11 is a flowchart of an example method to cache records, according to various embodiments.

FIG. 11 is a flowchart of an example method 1100 to cache records, according to various embodiments. The example method 1100 can be performed by, for example, the caching system 210.

In an operation 1102, a first write command including a first record is received from the virtual machine 202. As described herein, the staging module 302 of the caching system 210 can receive the first write command.

In an operation 1104, the first record is stored in the cache memory 306 with an indication of when the first write command was received. The staging module 302 is configured to, for example, store the first record in the cache memory 306 and position the first record in a write logging staging area 410.

In an operation 1106, a second write command is received from the virtual machine 202. As described herein, the staging module 302 of the caching system 210 can receive the second write command.

In an operation 1108, the second record is stored in the cache memory 306 with an indication of when the second write command was received. The staging module 302 is configured to, for example, store the second record in the cache memory 306 and position the second record after the first record in the write logging staging area 410.

In an operation 1110, an order of the first record and the second record is determined based on the stored indications of operations 1104 and 1108. As described above, the order is determined by, for example, the destaging module 304. In an operation 1112, based on the order of the operation 1110, the first record is retrieved from the cache memory. The destaging module 304 can retrieve the first record.

In an operation 1114, a first write command that includes the first record is sent to the storage system. The destaging module 304 can send the first write command to the storage system.

In an operation 1116, based on the order of the operation 1110, the second record is retrieved from the cache memory. The destaging module 304 can retrieve the second record.

In an operation 1118, a second write command that includes the second record is sent to the storage system. The destaging module 304 can send the second write command to the storage system.

Using the described systems and methods, records sent from a virtual machine to a host operating system are cached. The order of the records is preserved by storing an indication of when the records were received from the virtual machine. In some instances, records received at the same time are serialized. The order of the records is determined based on the indication and/or the serialization. The records are retrieved and sent to the storage system according to the determined order.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
   receiving a first write command sent from a virtual machine to a host operating system running on a computing system, the first write command instructing a storage system to store a first record at a first storage system memory location;
   storing the first record at a first location in a storage cache with an indication of when the first write command was received;
   receiving a second write command sent from the virtual machine to the host operating system running on the computing system, the second write command instructing the storage system to store a second record at the first storage system memory location;
   storing the second record at a second location in the storage cache with an indication of when the second write command was received;
   determining an order of the first record and the second record based on the stored indication of when the first write command was received and the stored indication of when the second write command was received;
   based on the determined order, retrieving the first record from the first cache location and sending the first write command to the storage system, and then retrieving the second record from the second cache location and sending the second write command to the storage system;
   simultaneously receiving a third write command and a fourth write command sent from the virtual machine to the host operating system running on the computing system, the third write command instructing the storage system to store a third record and the fourth write command instructing the storage system to store a fourth record;
   storing the third record at a third location in the cache storage with an indication of when the third write command was received;
   storing the fourth record at a fourth location in the cache storage with an indication that the fourth write command was received after the third write command was received;
   determining an order of the third record and the fourth record based on the stored indication of when the third write command was received and the stored indication of when the fourth write command was received; and
   based on the determined order of the third record and the fourth record, retrieving the third record from the third cache location and sending the third write command to the storage system, and then retrieving the fourth record from the fourth cache location and sending the fourth write command to the storage system.

2. The method of claim 1, further comprising updating a cache index after storing the second record at the second cache location to indicate, based on the determined order, that a most recent write command to the first storage system memory location received from the virtual machine is the second record stored in the second cache location.

3. The method of claim 2, further comprising:
   receiving a read command sent from the virtual machine to the host operating system running on the computing system, the read command instructing the storage system to read the first storage system memory location;
   determining, using the cache index, that the second record stored in the first storage system memory location is stored in the second cache location; and
   reading the second record from the second cache location.

4. The method of claim 1, further comprising,
   after the second write command is sent to the storage system, receiving a plurality of write commands from the virtual machine to the host operating system running on the computing system, each of the plurality of write commands instructing the storage system to store one of a plurality of records at respective storage system memory locations;
   storing the plurality of records at respective locations in the storage cache with an indication of when each of the plurality of write commands was received;

detecting a failure of the virtual machine;
determining an order of the plurality of records based on the stored indications of when each of the plurality of write commands was received; and
based on the determined order of the plurality of records, retrieving each of the plurality of the records in the determined order and sending each of the plurality of the write commands to the storage system in the determined order.

5. The method of claim 4, further comprising:
upon sending a first of the plurality of write commands to the storage system, storing, in the storage cache, a first checkpoint record identifying a first of the plurality of records included in the first of the plurality of write commands, the first of the plurality of write commands instructing the storage system to write the first of the plurality of records at a second storage system memory location.

6. The method of claim 5, further comprising, after storing the first checkpoint record:
sending a second of the plurality of write commands to the storage system;
determining that the second of the plurality of the write commands instructs the storage system to write a second of the plurality of records at the second storage system memory location;
storing, in the storage cache, a second checkpoint record identifying the second of the plurality of records included in the second of the plurality of write commands.

7. The method of claim 1, further comprising:
receiving a fifth write command sent from the virtual machine to the host operating system running on the computing system, the fifth write command instructing the storage system to store a fifth record at a second storage system memory location;
storing the fifth record at a fifth location in the cache storage with an indication of when the fifth write command was received;
receiving a sixth write command sent from the virtual machine to the host operating system running on the computing system, the sixth write command instructing the storage system to store a sixth record at a third storage system memory location;
storing the sixth record at a sixth location in the cache storage with an indication of when the sixth write command was received;
determining that the fifth record and the sixth record can be simultaneously written to the storage system because the second storage system memory location is not the same as the third storage system memory location; and
retrieving the fifth record from the fifth cache location and the sixth record from the sixth cache location and then simultaneously sending the fifth write command and the sixth write command to the storage system.

8. The method of claim 1, further comprising:
simultaneously receiving a fifth write command and a sixth write command sent from the virtual machine to the host operating system running on the computing system, the fifth write command instructing the storage system to store a fifth record at a second storage system memory location, the sixth write command instructing the storage system to store a sixth record at a third storage system memory location;
storing the fifth record at a fifth location in the cache storage with a batch number indicating that the fifth write command and the sixth write command were simultaneously received from the virtual machine;
storing the sixth record at a sixth location in the cache storage with the batch number;
determining that the fifth record and the sixth record have the same batch number; and
retrieving the fifth record from the fifth cache location and the sixth record from the sixth cache location and then simultaneously sending the fifth write command and the sixth write command to the storage system.

9. The method of claim 1, further comprising:
determining that a quantity of records stored in the storage cache meets a predefined threshold; and
sending a failure message to the virtual machine informing the virtual machine that a sent write command was not executed by the storage system.

10. A system comprising:
a computing system comprising a processor and a local memory;
a staging module configured to run on the processor and to receive a first write command sent from a virtual machine to a host operating system running on the computing system, the first write command instructing the storage system to store a first record at a first storage system memory location, store the first record at a first location in a storage cache with an indication of when the first write command was received, receive a second write command sent from the virtual machine to the host operating system running on the computing system, the second write command instructing the storage system to store a second record at the first storage system memory location, and store the second record at a second location in the storage cache with an indication of when the second write command was received; and
a destaging module configured to run on the processor and to determine an order of the first record and the second record based on the stored indication of when the first write command was received and the stored indication of when the second write command was received and, based on the determined order, retrieve the first record from the first cache location and send the first write command to the storage system, and then retrieve the second record from the second cache location and send the second write command to the storage system;
the staging module further configured to simultaneously receive a third write command and a fourth write command sent from the virtual machine to the host operating system running on the computing system, the third write command instructing the storage system to store a third record and the fourth write command instructing the storage system to store a fourth record, store the third record at a third location in the cache storage with an indication of when the third write command was received and store the fourth record at a fourth location in the cache storage with an indication that the fourth write command was received after the third write command was received;
the destaging module further configured to determine an order of the third record and the fourth record based on the stored indication of when the third write command was received and the stored indication of when the fourth write command was received and, based on the determined order of the third record and the fourth record, retrieve the third record from the third cache location and send the third write command to the storage system and then retrieve the fourth record from the fourth cache location and send the fourth write command to the storage system.

11. A non-transitory machine-readable medium having instructions embodied thereon, the instructions executable by one or more processors to perform a method comprising:

receiving a first write command sent from a virtual machine to a host operating system running on a computing system, the first write command instructing a storage system to store a first record at a first storage system memory location;

storing the first record at a first location in a storage cache with an indication of when the first write command was received;

receiving a second write command sent from the virtual machine to the host operating system running on the computing system, the second write command instructing the storage system to store a second record at the first storage system memory location;

storing the second record at a second location in the storage cache with an indication of when the second write command was received;

determining an order of the first record and the second record based on the stored indication of when the first write command was received and the stored indication of when the second write command was received; and based on the determined order, retrieving the first record from the first cache location and sending the first write command to the storage system, and then retrieving the second record from the second cache location and sending the second write command to the storage system;

simultaneously receiving a third write command and a fourth write command sent from the virtual machine to the host operating system running on the computing system, the third write command instructing the storage system to store a third record and the fourth write command instructing the storage system to store a fourth record;

storing the third record at a third location in the cache storage with an indication of when the third write command was received;

storing the fourth record at a fourth location in the cache storage with an indication that the fourth write command was received after the third write command was received;

determining an order of the third record and the fourth record based on the stored indication of when the third write command was received and the stored indication of when the fourth write command was received; and based on the determined order of the third record and the fourth record, retrieving the third record from the third cache location and sending the third write command to the storage system, and then retrieving the fourth record from the fourth cache location and sending the fourth write command to the storage system.

* * * * *